United States Patent [19]

Raimondi

[11] 3,863,996

[45] Feb. 4, 1975

[54] VIBRATION DAMPER BEARING

[75] Inventor: Albert A. Raimondi, Monroevile, Pa.

[73] Assignee: Westinghouse Electric Corporation, Pittsburgh, Pa.

[22] Filed: June 27, 1973

[21] Appl. No.: 374,179

[52] U.S. Cl. .................................... 308/122, 308/9
[51] Int. Cl. ........ F16c 1/24, F16c 7/04, F16c 39/04
[58] Field of Search ............ 308/9, 36.1, 78, 93, 97, 308/101, 107, 122

[56] References Cited
UNITED STATES PATENTS

| | | | |
|---|---|---|---|
| 1,606,424 | 11/1926 | Irgens et al. | 308/36.1 |
| 2,690,936 | 10/1954 | Cameron | 308/122 |
| 3,456,992 | 7/1969 | Kulina | 308/9 |
| 3,589,782 | 6/1971 | Le Breton | 308/122 |

Primary Examiner—M. Henson Wood, Jr.
Assistant Examiner—Howard Beltran
Attorney, Agent, or Firm—G. H. Telfer

[57] ABSTRACT

A damper bearing structure which limits vibrations from a large rotating shaft having a journal portion thereon. The bearing utilizes lubricating fluid bled from a hydrodynamic oil film surrounding the journal when the shaft is rotating to provide a source of pressurized fluid to fill a plurality of restrictor compensated pockets disposed on the surface of the bearing. Filling the pockets with a pressurized lubricating fluid provides a damper layer of fluid between the bearing and an associated support structure. The damper layer of lubricating fluid and the fluid in the pockets absorb vibrational energies transmitted to the bearing structure caused by vibration of the rotating shaft.

5 Claims, 5 Drawing Figures

PATENTED FEB 4 1975

VIBRATION DAMPER BEARING

BACKGROUND OF THE INVENTION

1. Field of the Invention:

This invention relates to journal bearings for large rotating shafts and in particular to an improved energy absorbing damper bearing.

2. Description of the Prior Art:

It is well known that large rotating shafts in certain rotating apparatus, such as a turbine, experience vibrations of the rotating shaft during operation of the apparatus. Excitation causing the vibrations of the rotating shaft at its journal portions is commonly termed rotor whirl. Self-excited whirl can result from the movement of the lubricant at the bearing itself, or from the dynamics of the motive fluid as it goes through the turbine, or from hysteresis caused by movement of sliding parts on the rotor.

If left unchecked, rotor whirl which displaces the bearing radially during vibration of the shaft can damage the bearing structure of the apparatus. The prior art has sought a variety of damping measures to inhibit the effect of self-induced rotor whirl.

In the prior art, a plurality of resilient bars are shrink-fitted within a bearing structure and housing to maintain a first and a second bearing member in spaced relationship with each other and to dissipate the energy created by rotor whirl. In addition, internal channels filled with a damping fluid combine with the resilient bars to absorb the energy created by rotor vibration. However, fabrication of bearing members utilizing resilient steel bars to dampen the vibratory effects of the rotor is time consuming and expensive. An example of the prior art which utilizes the resilient bars to dissipate vibrational energy is U.S. Pat. No. 3,589,782, issued to LeBreton et al, and assigned to the assignee of the present invention.

SUMMARY OF THE INVENTION

This invention provides an improved damper bearing structure wherein pockets of pressuized lubricating fluid absorb vibrational energies from the rotating shaft. The bearing structure disposes an internal channel to bleed lubricating fluid from a hydrodynamic layer which surrounds the journal portion of the rotating shaft to provide a source of pressurized fluid. The pressurized fluid is conducted through the interior of the bearing structure to each of a plurality of pockets or cavities disposed on the surface of the bearing. The pockets are disposed between the outer surface of the bearing structure and an associated support member. Each of the pockets are supplied with the pressurized lubricating fluid from the hydrodynamic layer through a restrictor orifice. The pressurized lubricating fluid fills the circumferentially spaced pockets on the bearing surface and provides a hydrostatic film which supports the bearing structure from the associated support member.

The hydrostatic film of lubricating fluid is disposed between the bearing structure and the associated support member, and with the lubricating fluid in the hydrostatic pockets absorbs and dampens vibrations transmitted to the bearing structure from the rotating shaft.

In addition, provision of a spherical outer surface of the bearing structure and a corresponding spherical inner surface of the associated support member provides a self-aligning characteristic for a bearing utilizing the teachings of this invention.

It is an object of this invention to provide a bearing structure which will absorb vibrational energies from a large rotating shaft supported by the bearing structure through the use of a hydrostatic film of pressurized lubricating fluid. It is a further object of this invention to provide a hydrostatic fluid film damper bearing that is easier and less costly to fabricate.

BRIEF DESCRIPTION OF THE DRAWINGS

The invention will be more fully understood from the following detailed description of an illustrative embodiment taken in connection with the drawings in which.

DESCRIPTION OF THE PREFERRED EMBODIMENT

Figure 1:
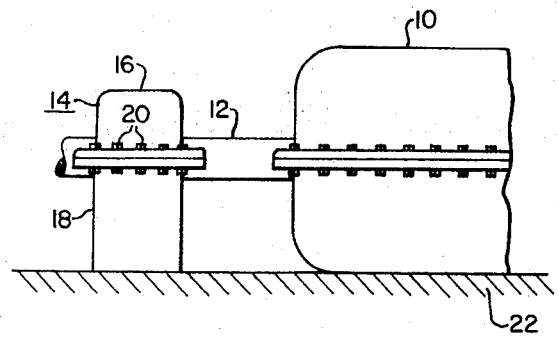
FIG. 1 is a side elevational view of a journal portion of a shaft supported by a bearing structure utilizing the teachings of the invention.

Throughout the following description similar reference characters refer to similar elements in all figures of the drawing.

Referring particularly to FIG. 1, a typical environment for the invention comprises a prime mover 10 which may preferably be a turbine, and a rotatable shaft 12 which is journaled in a support structure or pedestal 14. The pedestal 14 comprises an upper half 16 and a lower half 18, the halves being secured by fastening means 20. The pedestal 14 and the turbine 10 are suitably mounted on a foundation 22. It is to be understood that although FIG. 1 illustrates the bearing taught by this invention to be utilized with a turbine apparatus, any rotatable shaft having a journal portion and utilizing a journal bearing for support is within the contemplation of this invention.

Figure 2:
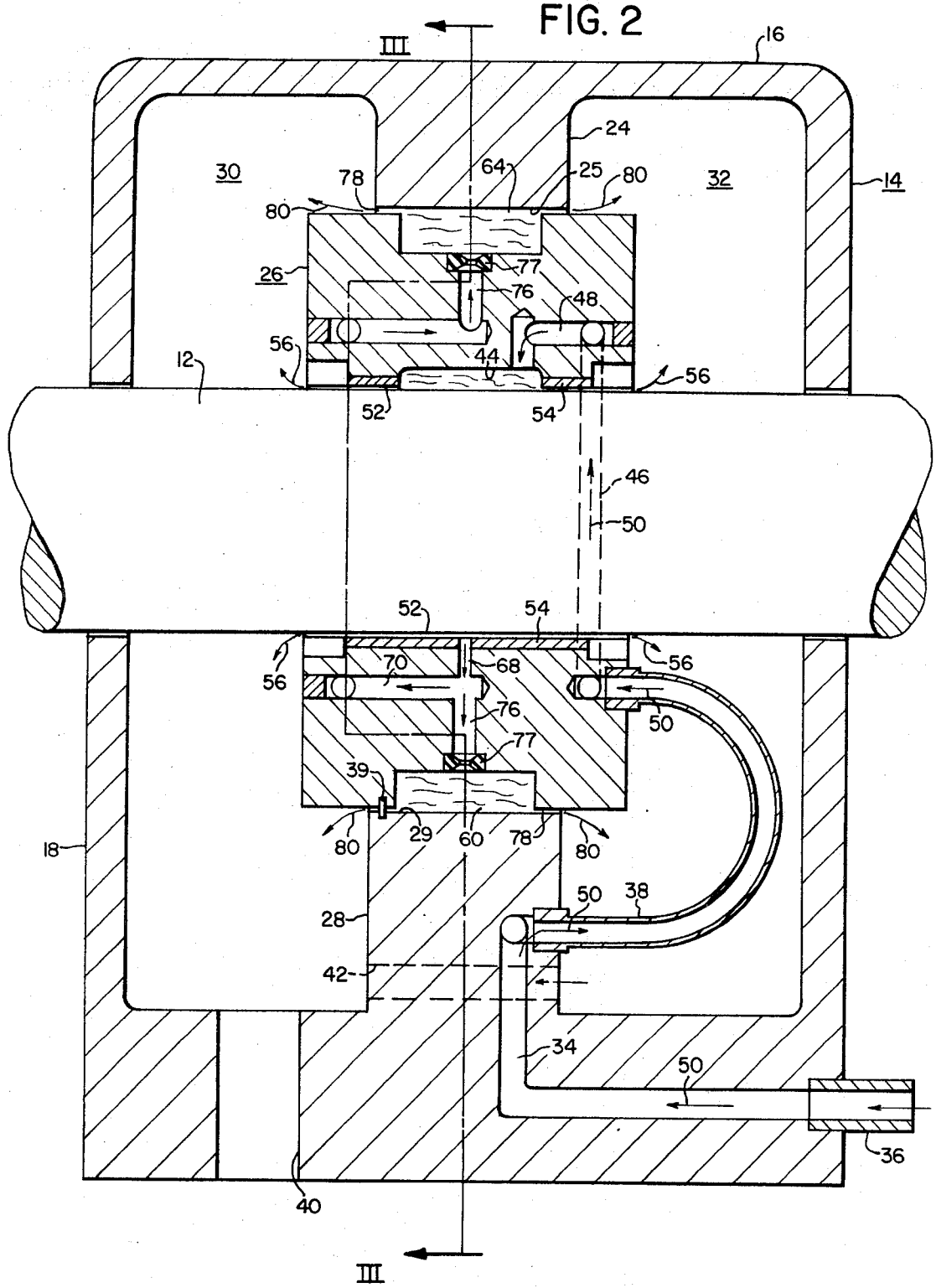
FIG. 2 is an enlarged view, in section, showing the bearing structure of FIG. 1.
Figure 3:
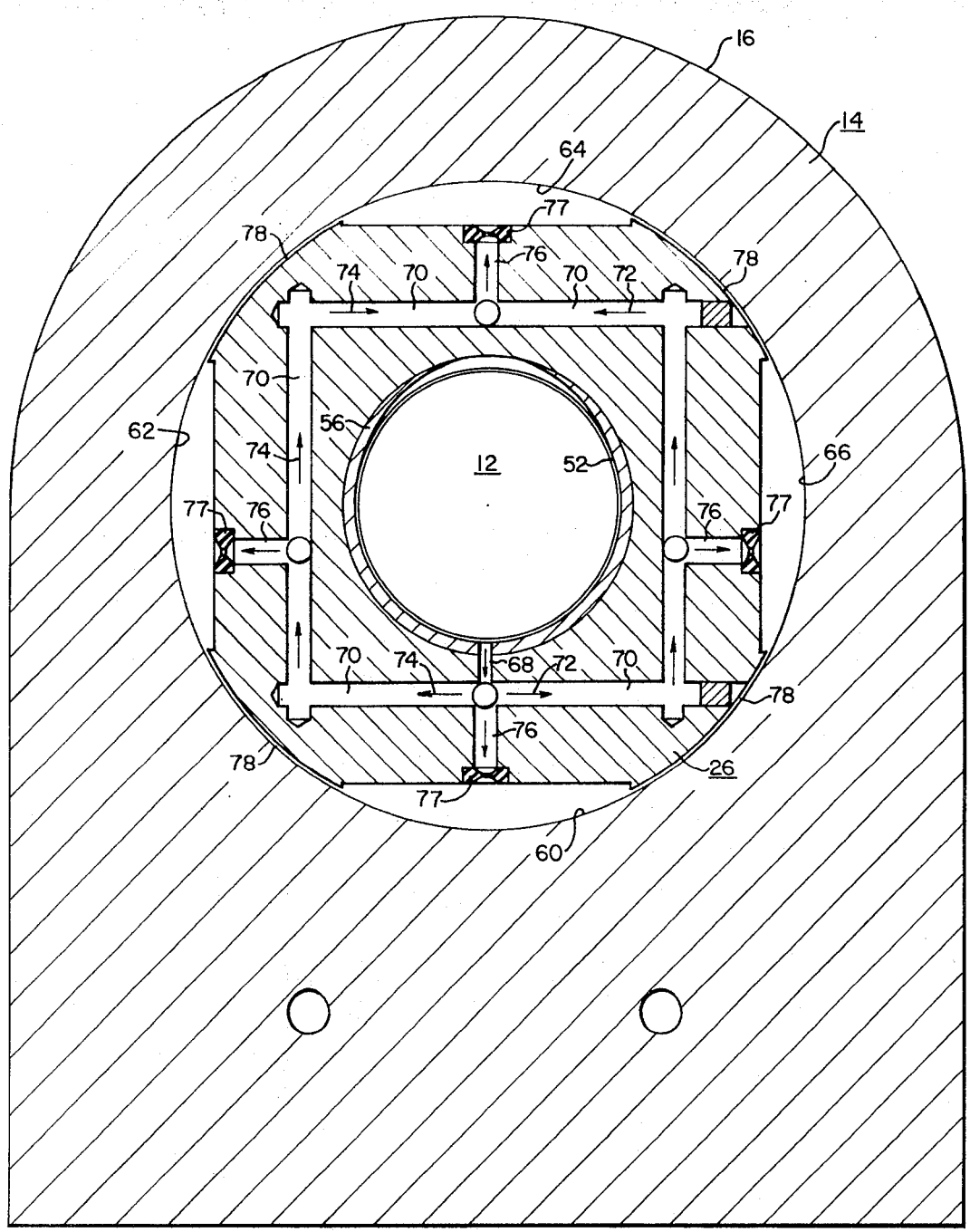
FIG. 3 is a section view taken along section line III—III in FIG. 2.

Referring now to FIGS. 2 and 3, the top portion 16 of the pedestal 14 has an annular top ring 24 integral therewith. The top ring 24 has a substantially cylindrical inner surface 25 disposed adjacent to the outer surface of a bearing structure generally indicated by reference numeral 26. The bottom half 18 of the pedestal 14 has an annular bottom ring 28 integral therewith. The bottom ring 28 has a cylindrical surface 29 which is disposed adjacent to the bearing structure 26. The interior of the pedestal 14 defines a first cavity 30 and a second cavity 32.

An L-shaped channel 34 is disposed within the bottom half 18 of the pedestal 14 and within the annular bottom ring 28 integral therewith. The channel 34 communicates with a lubricating fluid inlet 36 which is connected to the bottom half 18 of the pedestal 14. The channel 34 communicates at the opposite end thereof with a flexible conduit 38. The flexible conduit 38 carries the fluid lubricant from the inlet 36 into the bearing structure 26. A stop pin 39 extends between the bottom ring 24 and the bearing structure 26 to prevent rotation of the bearing 26 with respect to the pedestal 14.

A drain hole 40 communicates directly with the internal cavity 30. The drain hole 40 communicates indirectly with the internal cavity 32 through a channel 42 which extends through the bottom ring 28. The internal cavities 30 and 32 collect any oil spill-off from the bearing structure 26 and return the lubricating fluid to a fluid reservoir (not shown) through the drain hole 40.

An internal cavity 44 is disposed on the interior of the bearing structure 26 adjacent the journaled rotor 12. The cavity 44 communicates with the flexible conduit 38 through a conduit 46 and an L-shaped conduit 48.

The lubricating fluid flow, illustrated by reference arrows 50, is supplied from the fluid reservoir (not shown) into the L-shaped channel 34 through the inlet 36. The lubricating fluid passes from the L-shaped channel 34 through the flexible conduit 38 into the conduits 46 and 48 to the internal cavity 44. The lubricating fluid disposed within the internal cavity 44 forms a hydrodynamic oil film 52 around the journaled rotor 12 to separate the rotating journal surface 12 from a babbitt surface 54 of the bearing structure 26. Any spill-off 56 from the hydrodynamic film 52 falls into the internal cavities 30 and 32 and is returned to the fluid reservoir through the draining hole 40. The layer of babbitt metal 54, or some other bearing material, is disposed on the interior of the bearing structure 26 and lies between the hydrodynamic film 52 and the bearing structure 26.

Four hydrostatic pockets or cavities 60, 62, 64 and 66 are disposed on the surface of the bearing structure 26. All four hydrostatic pockets are visible in the view illustrated in FIG. 3, while pockets 60 and 64 are visible in the view shown in FIG. 2.

A bleed hole, or internal channel 68, extends through the babbitt layer 54 and drains some of the lubricating fluid in the hydrodynamic film 52. The bleed hole or internal channel 68 communicates with an internal conduit 70. Since the pressure within the lubricating fluid in the hydrodynamic film 52 is relatively high, a portion of the lubricating fluid within the hydrodynamic film 52 will be pumped through the bleed hole or internal channel 68 into the internal conduit 70. Lubricating fluid within the internal conduit 70 then bifurcates, as shown best in FIG. 3 by arrows 72 and 74, and fills the entire internal conduit 70 with lubricating fluid at a pressure slightly less than the pressure within the lubricating fluid in the hydrodynamic film 52.

Each of the hydrostatic pockets 60, 62, 64 and 66, communicate with the internal conduit 70, through an internal passage 76 having a restrictor 77 therein. Thus, the flow of pressurized lubricating fluid taken from the hydrodynamic film 52 through the bleed hole, or internal channel 68, is drawn from the internal conduit 70 and fills each of the hydrostatic pockets 60, 62, 64 and 66.

Lubricating fluid supplied to each hydrostatic pockets 60, 62, 64 and 66, from the internal conduit 70, flows through the internal passage 76 and the restrictor 77 into each hydrostatic pocket and fills each of the hydrostatic pockets with a pressurized lubricating fluid. The lubricating fluid in the hydrostatic pockets 60, 62, 64 and 66 provides a layer of lubricating fluid 78 between the exterior surface of the bearing structure 26 and the pedestal 14. By disposing the layer of pressurized lubricating fluid 78 between the outer surface of the bearing structure 26 and the interior structure of the pedestal 14, vibrations transmitted to the bearing structure 26 from the rotor journal 12 will be absorbed and dampened by both the layer 78 of lubricating fluid between the bearing structure 26 and the interior structure of the pedestal 14 and by the lubricating fluid disposed in each of the hydrostatic pockets 60, 62, 64 and 66.

Any spill-off 80 from the lubricating fluid layer 78 between the bearing structure 26 and the interior surface of the pedestal 14 is collected within the interior cavities 30 and 32 and drains to the fluid reservoir through the draining hole 40.

It is thus seen that provision of four circumferentially spaced hydrostatic pockets on the surface of the bearing structure and the introduction of a pressurized lubricating fluid, drawn from the hydrodynamic film into the hydrostatic pockets, provides a layer of lubricating fluid between the bearing structure and the interior surface of the pedestal. Provision of this lubricating fluid layer between the bearing structure and the interior surface of the pedestal provides a damping medium to absorb and dissipate vibrational energies transmitted to the bearing structure from the rotating journal.

Figure 4:
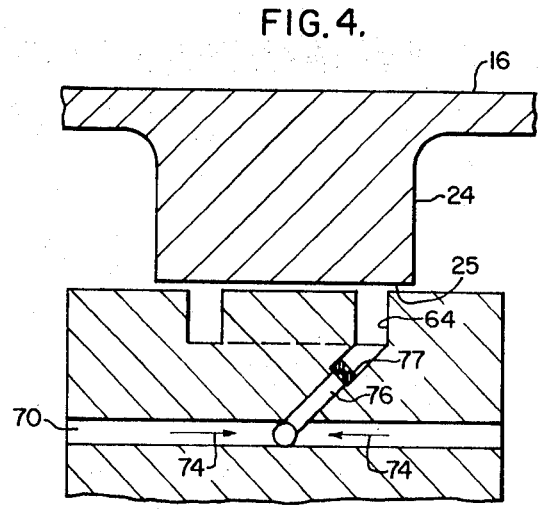
FIG. 4 is an expanded section view illustrating a different embodiment of the invention; and, FIG. 5 is an expanded section view showing a different embodiment of the invention.

Referring now to FIG. 4 an expanded view of the hydrostatic pocket 64 showing another embodiment of the invention is illustrated. In this embodiment of the invention, each hydrostatic pocket 60, 62, 64 and 66, with the pocket 64 chosen only as illustrative, has a substantially rectangular groove disposed on the surface of the bearing structure 26. The internal passage 76 having the restrictor 77 therein, which provides lubricating fluid from the internal conduit 70 to the hydrostatic pocket 64, extends at a skew from the internal conduit 70 to one side of the hydrostatic pocket 64.

Utilization of a hydrostatic pocket having a lesser volume of lubricating fluid therein provides for a superior damper effect than that obtainable with the full or open hydrostatic pocket illustrated in FIGS. 2 and 3.

Figure 5:
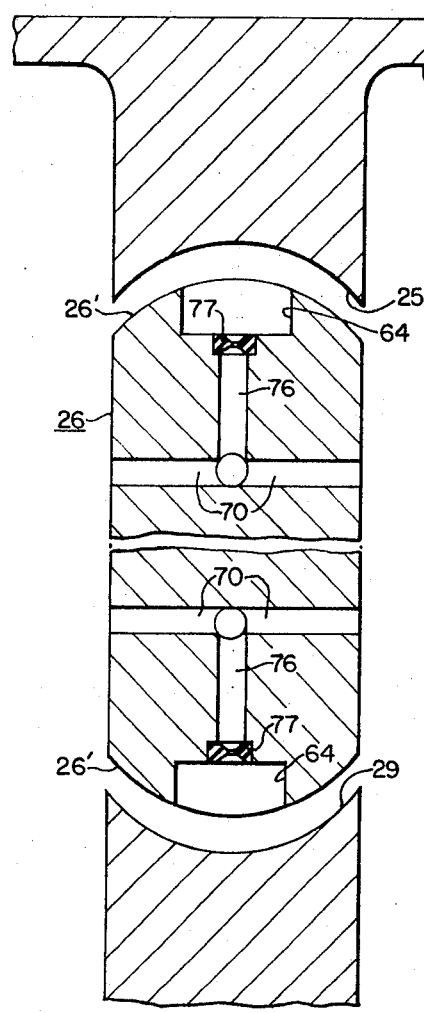

Referring now to FIG. 5, which is an expanded sectional view similar to FIG. 3, shows yet another embodiment of the invention. In FIG. 5, the internal surfaces 25 and 29 of the pedestal 14 have a spherical surface shape. The outer surface 26' of the bearing structure 26 has a corresponding spherical shape. Provision of corresponding spherical shapes on the interior of the pedestal 14 and on the outer surface of the bearing structure 26 provide a self-aligning feature which enables the bearing structure 26 to accommodate misalignments of the rotor shaft 12. Utilization of this embodiment of the invention permits the bearing structure 26 to accommodate misalignments of the rotor shaft 12 in a manner more expeditious than that possible by utilization of the cylindrical surfaces illustrated in FIGS. 2 and 3.

It is thus seen that provision of a pressurized lubricating fluid layer 78 in a series of circumferentially hydrostatic pockets 60, 62, 64 and 66 on the surface of the bearing member 26 provides an effective medium through which dissipation of the vibrational energies engendered by the rotating shaft 12 may be dissipated. It is also seen that utilization of the teachings of this invention provide an effective damper bearing for a rotating shaft that is easier and less expensive to fabricate than damper bearings utilized in the prior art.

I claim as my invention:

1. A damper bearing for a vibrating rotatable shaft having a journal portion thereon, said damper bearing comprising:
   a bearing structure for rotatable supporting said journal portion of said shaft,
   a support member surrounding said bearing structure,
   means for introducing a lubricating fluid into said bearing structure, said lubricating fluid forming a hydrodynamic film about said journal to support said shaft when said shaft is rotating, said hydrodynamic film having a predetermined pressure existing therein when said shaft is rotating, and,
   damping means disposed between said bearing structure and said support member, said damping means comprising
   a predetermined plurality of cavities disposed equiangularly about the surface of said bearing structure, said cavities being adjacent to said support member,
   means for conducting said fluid from said film to said cavities, and,
   flow restrictor means disposed within said conducting means, said flow restrictor means lowering the pressure of the lubricating fluid conducted to said cavities,
   said fluid conducted into said cavities being disposed in a layer between said bearing structure and said support structure to absorb and to dampen vibrations transmitted to said bearing structure by said shaft when said shaft is rotating.

2. The damper bearing of claim 1, wherein there are four cavities disposed on the surface of said bearing structure.

3. The damper bearing of claim 1 wherein each cavity is a continuous trough disposed into said surface of said bearing member.

4. The damper bearing of claim 1, wherein said conducting means comprises
   an internal conduit disposed within said bearing structure,
   an internal channel extending through said bearing structure between said hydrodynamic film and said internal conduit, said internal channel communicating with said hydrodynamic film and said internal conduit, and
   an internal passage having a flow restrictor therein, said internal passage communicating with said cavity and said internal conduit.

5. The damper bearing of claim 4 wherein:
   said outer surface of said bearing structure is spherical in shape; and
   said inner surface of said support member is spherical in shape, said outer surface of said bearing structure being adjacent to said inner surface of said support member.

* * * * *